US012699679B2

(12) United States Patent
Kumar et al.

(10) Patent No.: US 12,699,679 B2
(45) Date of Patent: Aug. 4, 2026

(54) SYSTEMS AND METHODS FOR PRODUCING DOMAIN-SPECIFIC DATA FOR AI MODEL TRAINING

(71) Applicant: HITACHI, Ltd., Tokyo (JP)

(72) Inventors: Aman Kumar, Santa Clara, CA (US); Lasitha Vidyaratne, Santa Clara, CA (US); Xian Yeow Lee, Santa Clara, CA (US); Shunichi Akatsuka, Santa Clara, CA (US); Dipanjan Ghosh, Santa Clara, CA (US); Ahmed Farahat, Santa Clara, CA (US); Chetan Gupta, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/887,087

(22) Filed: Sep. 17, 2024

(65) Prior Publication Data

US 2026/0079898 A1 Mar. 19, 2026

(51) Int. Cl.

*G06F 16/00* (2019.01)
*G06F 16/215* (2019.01)
*G06F 16/22* (2019.01)

(52) U.S. Cl.

CPC ........ *G06F 16/215* (2019.01); *G06F 16/2237* (2019.01)

(58) Field of Classification Search

None

See application file for complete search history.

(56) References Cited

U.S. PATENT DOCUMENTS 8,626,682 B2 * 1/2014 Malik ................. G06F 16/9024 706/12
9,330,179 B2 5/2016 Sun et al.
9,390,161 B2 * 7/2016 Shehata ................ G06F 40/289
9,542,412 B2 * 1/2017 Bates-Haus ........... G06F 16/215
10,558,715 B2 2/2020 Chernenkov et al.
11,093,480 B2 * 8/2021 Subhedar ............ G06F 16/2365
11,237,884 B2 * 2/2022 Walters ................... G06F 9/541
2007/0288431 A1 * 12/2007 Reitter .................. G06F 16/951

(Continued)

OTHER PUBLICATIONS

Wang, C., Liu, X., Yue, Y., Tang, X., Zhang, T., Jiayang, C., . . . & Zhang, Y. (2023). Survey on factuality in large language models: Knowledge, retrieval and domain-specificity. arXiv preprint arXiv:2310.07521. (Year: 2023).*

(Continued)

*Primary Examiner* — Farhan M Syed

(74) *Attorney, Agent, or Firm* — PROCOPIO, CORY, HARGREAVES & SAVITCH LLP

(57) ABSTRACT

Systems and methods for producing domain-specific data for training generative AI models as described herein systematically acquire, validate, and fine-tune AI models using domain-specific data. In embodiments, this comprises identifying seed documents, extracting keywords, performing refined searches, and scraping relevant content. The data is then pre-processed, chunked, and indexed. Using a retrieval-augmented generation approach, the system evaluates the quality and relevance of the data, ensuring efficient computational resource use and improved model training outcomes. By leveraging expert knowledge and systematic data validation, the accuracy and reliability of domain-specific AI models is enhanced.

20 Claims, 9 Drawing Sheets

(56) References Cited

U.S. PATENT DOCUMENTS

2012/0078895 A1* 3/2012 Chu-Carroll .......... G06F 16/332
707/E17.014
2012/0246100 A1* 9/2012 Shehata ................ G06F 16/345
707/706
2015/0106357 A1* 4/2015 Sun ....................... G06F 16/951
707/709
2015/0278241 A1* 10/2015 Bates-Haus ......... G06F 16/1748
707/692
2016/0078102 A1* 3/2016 Crouch ................. G06F 16/313
707/722
2017/0075918 A1* 3/2017 Bates-Haus ......... G06F 16/1748
2017/0357721 A1* 12/2017 Cherenkov ........... G06F 16/951
2018/0113930 A1* 4/2018 Frosst ..................... G06F 16/93
2018/0203928 A1* 7/2018 Ching ................... G06F 16/316
2019/0391992 A1* 12/2019 Shah ................... G06F 16/9024
2020/0334254 A1* 10/2020 Arye ................... G06F 16/2393
2022/0004715 A1* 1/2022 Patel ...................... G06N 5/022
2022/0019592 A1* 1/2022 Yang ..................... G06F 16/215
2022/0164346 A1* 5/2022 Mitra ..................... G06N 20/10
2023/0014241 A1* 1/2023 Montoya .............. G06V 20/188
2024/0127008 A1* 4/2024 Pabolu ................ G06F 21/6254
2024/0370209 A1* 11/2024 Darji ..................... G06F 3/0631
2024/0386015 A1* 11/2024 Crabtree ............. G06F 16/9024
2024/0394151 A1* 11/2024 Frese .................. G06F 11/1469
2024/0412720 A1* 12/2024 Vasylyev .......... G06F 16/90332
2024/0420079 A1* 12/2024 Montoya ................. G01W 1/14
2025/0013394 A1* 1/2025 Darji ..................... G06F 3/0631
2026/0004121 A1* 1/2026 Mace ..................... G06N 3/045

OTHER PUBLICATIONS

Chen, H. (2022). Data Quality Evaluation and Improvement (Doctoral dissertation, University of North Texas). (Year: 2022).*

Bulfamante, D. (2023). Generative enterprise search with extensible knowledge base using ai (Doctoral dissertation, Politecnico di Torino). (Year: 2023).*

Gao et al., "Retrieval-augmented generation for large language models: A survey," arXiv:2312.10997v1 (Dec. 18, 2023), 26 pages.

* cited by examiner

QUESTION → 43. ON A 45-DEGREE ANGLE VALVE, WHAT INTERFERENCE ANGLE IS USED?

A.) 5 DEGREES B.) 1 DEGREE C.) 0.5 DEGREES D.) 0.75 DEGREES

TRUE LABEL → B. B – THE VALVE IS OFTEN GROUND WITH A FACE ANGLE 1 DEGREE LESS THAN THE SEAT ANGLE TO COMPENSATE FOR THE CHANGE IN HOT SEATING AND TO CLEAN OFF THE CARBON

RAG OUTPUT → B. ✓

C. ✗

| ID | STARTPHRASE | ENDING0 | ENDING1 | ENDING2 | ENDING3 | TRUE_LABEL | RAG_OUTPUT |
|---|---|---|---|---|---|---|---|
| 1 | WHAT IS THE PURPOSE OF THE CAR'S ALTERNATOR? | A. START THE ENGINE | B. CHARGE THE BATTERY | C. POWER THE HEADLIGHTS | D. CONTROLS AIR CONDITIONING | B | B |
| 2 | WHICH PART CONNECTS THE WHEELS TO THE STEERING SYSTEM? | A. AXLE | B. STEERING RACK | C. TIE ROD | D. BRAKE PAD | C | C |
| 3 | WHAT FLUID IS ESSENTIAL FOR THE HYDRAULIC BRAKE SYSTEM? | A. ENGINE OIL | B. TRANSMISSION FLUID | C. BRAKE FLUID | D. POWER STEERING FLUID | C | C |
| 4 | WHAT DOES A TRANSMISSION CONTROL MODULE (TCM) DO? | A. CONTROLS FUEL INJECTION | B. CONTROLS GEAR SHIFTING | C. MANAGES ENGINE COOLING | D. POWERS THE ALTERNATOR | B | B |
| 5 | WHICH ENGINE COMPONENT OPENS AND CLOSES THE INTAKE AND EXHAUST VALVES? | A. CRANKSHAFT | B. CAMSHAFT | C. TIMING BELT | D. PISTON | B | B |
| 6 | WHAT DOES THE OXYGEN SENSOR IN A CAR MONITOR? | A. FUEL LEVELS | B. EXHAUST EMISSIONS | C. OIL PRESSURE | D. ENGINE TEMPERATURE | B | A |
| 7 | WHICH SYSTEM IN A CAR USES A COMPRESSOR AND REFRIGERANT? | A. COOLING SYSTEM | B. BRAKE SYSTEM | C. AIR CONDITIONING | D. SUSPENSION SYSTEM | C | C |
| 8 | WHICH SYSTEM IN A CAR USES A COMPRESSOR AND REFRIGERANT? | A. REDUCE EXHAUST NOISE | B. INCREASE ENGINE POWER | C. IMPROVES FUEL EFFICIENCY | D. FILTERS EXHAUST GASES | A | A |
| 9 | WHAT IS THE ROLE OF THE SERPENTINE BELT IN A VEHICLE? | A. POWERS ELECTRICAL COMPONENTS | B. DRIVES THE WHEELS | C. CONNECTS CAMSHAFT TO CRANKSHAFT | D. SYNCHS THE TIMING | A | B |
| 10 | WHAT DOES A TACHOMETER MEASURE IN A CAR? | A. SPEED | B. ENGINE TEMPERATURE | C. ENGINE RPM | D. BATTERY VOLTAGE | C | D |

FIG. 3

3800_URL_D2_107M_TOK.TXT

{"TEXT": "AUTOMOTIVE SYSTEMS AND COMPONENTS FORM THE BACKBONE OF MODERN VEHICLE TECHNOLOGY. EACH COMPONENT PLAYS A CRUCIAL ROLE IN ENSURING THE EFFICIENT, SAFE, AND RELIABLE OPERATION OF THE VEHICLE. LET'S DIVE DEEP INTO SOME OF THE MOST CRITICAL COMPONENTS DISCUSSED IN THE TABLE QUESTIONS, EXPLORING THEIR FUNCTIONS, IMPORTANCE, AND HOW THEY INTERACT WITH OTHER SYSTEMS IN A VEHICLE. ### ALTERNATORS: THE VEHICLE'S POWER GENERATOR THE ALTERNATOR IS ONE OF THE MOST ESSENTIAL COMPONENTS IN A VEHICLE'S ELECTRICAL SYSTEM. IT IS RESPONSIBLE FOR CONVERTING MECHANICAL ENERGY INTO ELECTRICAL ENERGY, WHICH CHARGES THE BATTERY AND POWERS THE ELECTRICAL SYSTEMS WHILE THE ENGINE IS RUNNING. WITHOUT A FUNCTIONING ALTERNATOR, THE BATTERY WOULD QUICKLY DISCHARGE, LEADING TO A LOSS OF POWER TO CRITICAL COMPONENTS LIKE THE HEADLIGHTS, RADIO, AND AIR CONDITIONING. THE ALTERNATOR WORKS IN CONJUNCTION WITH THE BATTERY TO SUPPLY POWER. WHILE THE BATTERY PROVIDES THE INITIAL BURST OF ENERGY TO START THE ENGINE, THE ALTERNATOR TAKES OVER ONCE THE ENGINE IS RUNNING, PROVIDING A STEADY SUPPLY OF POWER TO KEEP THE VEHICLE'S ELECTRICAL SYSTEMS OPERATING SMOOTHLY. MODERN ALTERNATORS ARE DESIGNED TO BE HIGHLY EFFICIENT, REDUCING FUEL CONSUMPTION BY MINIMIZING THE ENGINE LOAD. REGULAR MAINTENANCE OF THE ALTERNATOR IS ESSENTIAL TO AVOID BREAKDOWNS. SIGNS OF A FAILING ALTERNATOR INCLUDE DIMMING HEADLIGHTS, A WEAK BATTERY, AND A GROWLING OR WHINING NOISE FROM THE ENGINE BAY. VEHICLE OWNERS SHOULD HAVE THEIR ALTERNATOR INSPECTED REGULARLY AND REPLACED WHEN NECESSARY TO ENSURE RELIABLE OPERATION. ### TIE RODS: CRUCIAL CONNECTIONS IN THE STEERING SYSTEM TIE RODS ARE A FUNDAMENTAL PART OF A VEHICLE'S STEERING SYSTEM, CONNECTING THE STEERING RACK TO THE WHEELS. THEY TRANSMIT THE FORCE FROM THE STEERING WHEEL TO THE WHEELS, ALLOWING THE DRIVER TO CONTROL THE VEHICLE'S DIRECTION. WITHOUT FUNCTIONING TIE RODS, IT WOULD BE IMPOSSIBLE TO ACCURATELY STEER THE VEHICLE. TIE RODS CONSIST OF AN INNER AND OUTER END, WHICH ARE CONNECTED BY A SLEEVE THAT ALLOWS FOR ADJUSTMENT. THE INNER TIE ROD IS ATTACHED TO THE STEERING RACK, WHILE THE OUTER TIE ROD IS CONNECTED TO THE WHEEL SPINDLE. THIS ARRANGEMENT ALLOWS FOR PRECISE CONTROL OF THE WHEELS' ANGLE, ENSURING THE VEHICLE FOLLOWS THE DRIVER'S INTENTIONS. A DAMAGED OR WORN TIE ROD CAN LEAD TO A VARIETY OF PROBLEMS, INCLUDING STEERING WHEEL VIBRATIONS, UNEVEN TIRE WEAR, AND POOR HANDLING. IN EXTREME CASES, A BROKEN TIE ROD CAN CAUSE COMPLETE LOSS OF STEERING CONTROL, WHICH CAN BE EXTREMELY DANGEROUS. REGULAR INSPECTIONS AND REPLACEMENTS ARE ESSENTIAL TO MAINTAINING A SAFE AND RELIABLE STEERING SYSTEM. ### BRAKE FLUID: THE LIFEBLOOD OF THE BRAKING SYSTEM BRAKE FLUID IS AN ESSENTIAL COMPONENT IN A VEHICLE'S HYDRAULIC BRAKE SYSTEM, TRANSMITTING THE FORCE FROM THE BRAKE PEDAL TO THE BRAKE CALIPERS, WHICH THEN APPLY PRESSURE TO THE BRAKE PADS TO SLOW DOWN OR STOP THE VEHICLE. WITHOUT ADEQUATE BRAKE FLUID, THE BRAKES WILL NOT FUNCTION PROPERLY, LEADING TO POTENTIALLY DANGEROUS DRIVING CONDITIONS. BRAKE FLUID IS DESIGNED TO WITHSTAND HIGH TEMPERATURES AND MAINTAIN A CONSISTENT VISCOSITY, ENSURING THAT THE BRAKING SYSTEM OPERATES EFFICIENTLY UNDER ALL CONDITIONS. THERE ARE SEVERAL TYPES OF BRAKE FLUID, INCLUDING DOT 3, DOT 4, AND DOT 5, EACH WITH DIFFERENT BOILING POINTS AND COMPOSITIONS. IT IS IMPORTANT TO USE THE CORRECT TYPE OF BRAKE FLUID SPECIFIED BY THE VEHICLE MANUFACTURER TO ENSURE PROPER BRAKE PERFORMANCE. OVER TIME, BRAKE FLUID CAN ABSORB MOISTURE FROM THE AIR, LOWERING ITS BOILING POINT AND REDUCING ITS EFFECTIVENESS. THIS CAN LEAD TO A CONDITION KNOWN AS "BRAKE FADE," WHERE THE BRAKES BECOME LESS RESPONSIVE UNDER HEAVY USE. TO PREVENT THIS, BRAKE FLUID SHOULD BE CHANGED REGULARLY, ACCORDING TO THE VEHICLE MANUFACTURER'S RECOMMENDATIONS. ### TRANSMISSION CONTROL MODULES (TCM): BRAIN OF THE TRANSMISSION SYSTEM THE TRANSMISSION CONTROL MODULE (TCM) IS A VITAL COMPONENT THAT MANAGES THE OPERATION OF A VEHICLE'S TRANSMISSION. IT USES DATA FROM VARIOUS SENSORS TO CONTROL GEAR SHIFTS, ENSURING THAT THE TRANSMISSION OPERATES SMOOTHLY AND EFFICIENTLY. THE TCM COMMUNICATES WITH THE ENGINE CONTROL UNIT (ECU) AND OTHER MODULES TO OPTIMIZE PERFORMANCE BASED ON DRIVING CONDITIONS AND DRIVER INPUT. THE TCM IS RESPONSIBLE FOR A WIDE RANGE OF FUNCTIONS, INCLUDING SHIFT TIMING, TORQUE CONVERTER LOCKUP, AND GEAR SELECTION. IT CONSTANTLY MONITORS PARAMETERS SUCH AS VEHICLE SPEED, THROTTLE POSITION, AND ENGINE LOAD TO DETERMINE THE OPTIMAL SHIFT POINTS. THIS ENSURES THAT THE VEHICLE DELIVERS A BALANCE OF PERFORMANCE AND FUEL EFFICIENCY. A MALFUNCTIONING TCM CAN LEAD TO A VARIETY OF ISSUES, INCLUDING ERRATIC SHIFTING, DELAYED ENGAGEMENT, AND EVEN COMPLETE TRANSMISSION FAILURE. COMMON SYMPTOMS OF TCM FAILURE INCLUDE SLIPPING GEARS, HARSH SHIFTS, AND ILLUMINATED WARNING LIGHTS ON THE DASHBOARD. IF ANY OF THESE SYMPTOMS ARE PRESENT, IT IS IMPORTANT TO HAVE THE TCM DIAGNOSED AND REPAIRED BY A QUALIFIED TECHNICIAN. ### CAMSHAFTS: TIMING THE ENGINE'S BREATH THE CAMSHAFT IS A CRITICAL COMPONENT IN AN INTERNAL COMBUSTION ENGINE, RESPONSIBLE FOR OPENING AND CLOSING THE ENGINE'S INTAKE AND EXHAUST VALVES. IT IS DRIVEN BY THE CRANKSHAFT AND SYNCHRONIZED TO ENSURE THAT THE VALVES OPEN AND CLOSE AT THE RIGHT TIMES DURING THE ENGINE'S CYCLE. THIS SYNCHRONIZATION IS ESSENTIAL FOR OPTIMAL ENGINE

3800_URL_D2_107M_TOK.TXT

... PERFORMANCE, AS IT ENSURES THAT THE ENGINE BREATHES PROPERLY. THE CAMSHAFT HAS LOBES, OR CAMS, THAT PUSH AGAINST THE VALVE LIFTERS, CAUSING THE VALVES TO OPEN. THE SHAPE AND TIMING OF THESE CAMS DETERMINE THE ENGINE'S POWER CHARACTERISTICS, WITH DIFFERENT CAMSHAFT PROFILES BEING USED FOR VARIOUS PERFORMANCE GOALS. FOR EXAMPLE, A HIGH-PERFORMANCE CAMSHAFT MAY HAVE MORE AGGRESSIVE LOBES TO INCREASE AIRFLOW INTO THE ENGINE, RESULTING IN MORE POWER. A WORN OR DAMAGED CAMSHAFT CAN LEAD TO A VARIETY OF ENGINE ISSUES, INCLUDING POOR PERFORMANCE, MISFIRING, AND INCREASED EMISSIONS. REGULAR INSPECTIONS AND MAINTENANCE ARE ESSENTIAL TO ENSURING THAT THE CAMSHAFT OPERATES PROPERLY AND DELIVERS THE DESIRED PERFORMANCE CHARACTERISTICS ### OXYGEN SENSORS: THE EYES OF THE ENGINE CONTROL UNIT OXYGEN SENSORS PLAY A CRUCIAL ROLE IN A VEHICLE'S ENGINE MANAGEMENT SYSTEM, MONITORING THE LEVEL OF OXYGEN IN THE EXHAUST GASES AND PROVIDING FEEDBACK TO THE ENGINE CONTROL UNIT (ECU). THIS INFORMATION IS USED TO ADJUST THE AIR-FUEL MIXTURE FOR OPTIMAL COMBUSTION, ENSURING THAT THE ENGINE OPERATES EFFICIENTLY AND WITH MINIMAL EMISSIONS. THERE ARE TYPICALLY TWO TYPES OF OXYGEN SENSORS IN A VEHICLE: UPSTREAM AND DOWNSTREAM. UPSTREAM OXYGEN SENSORS ARE LOCATED BEFORE THE CATALYTIC CONVERTER AND MEASURE THE AMOUNT OF OXYGEN IN THE EXHAUST GASES COMING DIRECTLY FROM THE ENGINE. DOWNSTREAM OXYGEN SENSORS ARE LOCATED AFTER THE CATALYTIC CONVERTER AND MONITOR ITS EFFICIENCY IN REDUCING EMISSIONS. A FAULTY OXYGEN SENSOR CAN LEAD TO A VARIETY OF ISSUES, INCLUDING POOR FUEL ECONOMY, INCREASED EMISSIONS, AND EVEN ENGINE DAMAGE. COMMON SYMPTOMS OF A BAD OXYGEN SENSOR INCLUDE A ROUGH IDLE, HESITATION DURING ACCELERATION, AND ILLUMINATED CHECK ENGINE LIGHT. REPLACING A FAULTY OXYGEN SENSOR IS ESSENTIAL TO MAINTAINING THE VEHICLE'S PERFORMANCE AND FUEL EFFICIENCY. ### AIR CONDITIONING SYSTEMS: KEEPING YOU COOL THE AIR CONDITIONING SYSTEM IN A VEHICLE IS RESPONSIBLE FOR MAINTAINING A COMFORTABLE TEMPERATURE INSIDE THE CABIN, ESPECIALLY DURING HOT WEATHER. IT WORKS BY REMOVING HEAT FROM THE AIR INSIDE THE VEHICLE AND DISCHARGING IT OUTSIDE. THE SYSTEM INCLUDES SEVERAL COMPONENTS, INCLUDING THE COMPRESSOR, CONDENSER, EVAPORATOR, AND REFRIGERANT. THE COMPRESSOR IS THE HEART OF THE AIR CONDITIONING SYSTEM, PUMPING REFRIGERANT THROUGH THE SYSTEM. AS THE REFRIGERANT FLOWS THROUGH THE CONDENSER, IT RELEASES HEAT TO THE OUTSIDE AIR, COOLING THE REFRIGERANT BEFORE IT ENTERS THE EVAPORATOR. IN THE EVAPORATOR, THE REFRIGERANT ABSORBS HEAT FROM THE AIR INSIDE THE VEHICLE, COOLING THE AIR BEFORE IT IS BLOWN INTO THE CABIN. REGULAR MAINTENANCE OF THE AIR CONDITIONING SYSTEM IS ESSENTIAL TO KEEP IT OPERATING EFFICIENTLY. THIS INCLUDES CHECKING THE REFRIGERANT LEVEL, INSPECTING THE BELTS AND HOSES, AND CLEANING THE CONDENSER AND EVAPORATOR. A WELL-MAINTAINED AIR CONDITIONING SYSTEM WILL KEEP THE CABIN COOL AND COMFORTABLE, EVEN IN THE HOTTEST WEATHER. ### MUFFLERS: QUIETING THE NOISE THE MUFFLER, ALSO KNOWN AS A SILENCER, IS AN IMPORTANT PART OF A VEHICLE'S EXHAUST SYSTEM. ITS PRIMARY FUNCTION IS TO REDUCE THE NOISE PRODUCED BY THE ENGINE'S EXHAUST GASES. MUFFLERS ACHIEVE THIS BY CHANNELING THE EXHAUST GASES THROUGH A SERIES OF CHAMBERS OR BAFFLES, WHICH ABSORB AND DISSIPATE THE SOUND. MUFFLERS ARE DESIGNED TO MINIMIZE EXHAUST NOISE WITHOUT SIGNIFICANTLY RESTRICTING THE FLOW OF EXHAUST GASES. HIGH-PERFORMANCE MUFFLERS ARE TUNED TO PROVIDE A BALANCE BETWEEN SOUND REDUCTION AND MINIMAL BACKPRESSURE, WHICH CAN IMPROVE ENGINE PERFORMANCE. IN ADDITION TO REDUCING NOISE, MUFFLERS CAN ALSO HELP CONTROL EMISSIONS BY INCORPORATING A RESONATOR OR CATALYTIC CONVERTER. OVER TIME, MUFFLERS CAN BECOME DAMAGED OR CLOGGED, LEADING TO INCREASED EXHAUST NOISE AND REDUCED PERFORMANCE. VEHICLE OWNERS SHOULD HAVE THEIR MUFFLER INSPECTED REGULARLY AND REPLACED WHEN NECESSARY TO MAINTAIN A QUIET AND EFFICIENT EXHAUST SYSTEM. ### SERPENTINE BELTS: DRIVING THE ESSENTIALS THE SERPENTINE BELT IS A LONG, WINDING BELT THAT DRIVES MANY OF THE ENGINE'S ACCESSORIES, INCLUDING THE ALTERNATOR, POWER STEERING PUMP, WATER PUMP, AND AIR CONDITIONING COMPRESSOR. IT IS NAMED FOR ITS SNAKE-LIKE PATH AROUND THESE COMPONENTS, WHICH ALLOWS IT TO DRIVE MULTIPLE ACCESSORIES WITH A SINGLE BELT. SERPENTINE BELTS ARE MADE OF DURABLE MATERIALS THAT CAN WITHSTAND THE HARSH CONDITIONS OF THE ENGINE COMPARTMENT, BUT THEY DO WEAR OUT OVER TIME. SIGNS OF A WORN SERPENTINE BELT INCLUDE SQUEALING NOISES FROM THE ENGINE BAY, VISIBLE CRACKS OR FRAYING ON THE BELT, AND ACCESSORIES FAILING TO OPERATE PROPERLY. REGULAR INSPECTION AND REPLACEMENT OF THE SERPENTINE BELT ARE ESSENTIAL TO ENSURING THAT ALL OF THE ENGINE'S ACCESSORIES OPERATE PROPERLY. A BROKEN SERPENTINE BELT CAN LEAD TO A LOSS OF POWER STEERING, BATTERY CHARGING, AND ENGINE COOLING, WHICH CAN RESULT IN A BREAKDOWN. ### TACHOMETERS: KEEPING TRACK OF ENGINE SPEED A TACHOMETER IS A GAUGE THAT MEASURES THE ENGINE'S REVOLUTIONS PER MINUTE (RPM). IT PROVIDES THE DRIVER WITH INFORMATION ABOUT THE ENGINE SPEED, ALLOWING THEM TO SHIFT GEARS AT THE OPTIMAL TIME TO AVOID OVER-REVVING THE ENGINE. TACHOMETERS ARE ESPECIALLY USEFUL IN MANUAL TRANSMISSION VEHICLES, WHERE PRECISE ENGINE SPEED CONTROL IS CRITICAL FOR SMOOTH AND EFFICIENT DRIVING. TACHOMETERS WORK BY RECEIVING A SIGNAL FROM THE IGNITION SYSTEM OR ENGINE CONTROL MODULE, WHICH IS THEN DISPLAYED ON A GAUGE IN THE INSTRUMENT CLUSTER. THE GAUGE IS USUALLY MARKED WITH A REDLINE, INDICATING THE MAXIMUM SAFE ENGINE SPEED. EXCEEDING THE REDLINE CAN RESULT IN ENGINE DAMAGE, SO DRIVERS SHOULD USE THE TACHOMETER TO MONITOR ENGINE SPEED AND SHIFT GEARS ACCORDINGLY. IN SOME HIGH-PERFORMANCE VEHICLES, TACHOMETERS ARE EQUIPPED WITH SHIFT LIGHTS OR BUZZERS THAT ALERT THE DRIVER WHEN IT'S TIME TO SHIFT GEARS. THIS CAN BE ESPECIALLY USEFUL IN RACING SITUATIONS, WHERE TIMELY GEAR SHIFTS ARE CRUCIAL FOR MAXIMIZING PERFORMANCE ### CONCLUSION: THE IMPORTANCE OF MAINTENANCE AND CARE EACH OF THESE AUTOMOTIVE COMPONENTS PLAYS A VITAL ROLE IN THE OVERALL PERFORMANCE, SAFETY, AND RELIABILITY OF A VEHICLE. REGULAR MAINTENANCE AND TIMELY REPLACEMENT OF WORN OR DAMAGED PARTS ARE ESSENTIAL TO KEEPING A VEHICLE RUNNING SMOOTHLY AND SAFELY. WHETHER IT'S THE ALTERNATOR, TIE RODS, BRAKE FLUID, TRANSMISSION CONTROL MODULE, CAMSHAFT, OXYGEN SENSORS, AIR CONDITIONING SYSTEM, MUFFLER, SERPENTINE BELT, OR TACHOMETER, EACH COMPONENT MUST BE MAINTAINED TO ENSURE THAT THE VEHICLE OPERATES AT ITS BEST. VEHICLE OWNERS SHOULD FOLLOW THE MANUFACTURER'S RECOMMENDED MAINTENANCE SCHEDULE AND HAVE THEIR VEHICLES INSPECTED REGULARLY BY A QUALIFIED MECHANIC. BY TAKING CARE OF THESE ESSENTIAL COMPONENTS, DRIVERS CAN ENJOY A SAFE, RELIABLE, AND EFFICIENT DRIVING EXPERIENCE. IN SUMMARY, UNDERSTANDING THE FUNCTION AND IMPORTANCE OF THESE AUTOMOTIVE COMPONENTS IS CRUCIAL FOR BOTH VEHICLE OWNERS AND MECHANICS. IT ENABLES THEM TO IDENTIFY ISSUES EARLY, PERFORM NECESSARY MAINTENANCE, AND MAKE INFORMED DECISIONS ABOUT REPAIRS AND REPLACEMENTS. WITH PROPER CARE AND ATTENTION, THESE COMPONENTS WILL PROVIDE MANY YEARS OF TROUBLE-FREE SERVICE, KEEPING VEHICLES ON THE ROAD AND OPERATING AT THEIR PEAK PERFORMANCE

3800_URL_D2_107M_TOK.TXT

ALTERNATORS: CRUCIAL COMPONENTS IN VEHICLE ELECTRICAL SYSTEMS THE ALTERNATOR IS ONE OF THE MOST CRUCIAL COMPONENTS IN A VEHICLE'S ELECTRICAL SYSTEM. IT IS RESPONSIBLE FOR GENERATING ELECTRICAL POWER TO CHARGE THE BATTERY AND RUN THE VEHICLE'S ELECTRICAL SYSTEMS WHILE THE ENGINE IS RUNNING. UNLIKE A BATTERY, WHICH STORES ENERGY, THE ALTERNATOR CONVERTS MECHANICAL ENERGY INTO ELECTRICAL ENERGY THROUGH ELECTROMAGNETIC INDUCTION. THIS PROCESS ENSURES THAT THE VEHICLE'S BATTERY IS CONSTANTLY RECHARGED AND THAT ALL ELECTRICAL COMPONENTS, INCLUDING LIGHTS, INFOTAINMENT SYSTEMS, AND ELECTRIC POWER STEERING, OPERATE SMOOTHLY. MODERN ALTERNATORS ARE DESIGNED TO BE HIGHLY EFFICIENT, OFTEN INCORPORATING INTERNAL REGULATORS THAT MAINTAIN CONSISTENT VOLTAGE LEVELS, THUS PREVENTING DAMAGE TO THE VEHICLE'S ELECTRONICS. THE ALTERNATOR IS MOUNTED ON THE ENGINE AND DRIVEN BY THE SERPENTINE BELT, WHICH TURNS A ROTOR INSIDE A STATOR, GENERATING AC (ALTERNATING CURRENT). THIS AC IS THEN CONVERTED INTO DC (DIRECT CURRENT) BY A RECTIFIER BEFORE BEING SENT TO THE BATTERY AND ELECTRICAL SYSTEM. FAILURE TO MAINTAIN THE ALTERNATOR CAN LEAD TO A SERIES OF ISSUES, INCLUDING DIMMING HEADLIGHTS, A DEAD BATTERY, OR EVEN A VEHICLE THAT WON'T START. COMMON SIGNS OF A FAILING ALTERNATOR INCLUDE A WHINING NOISE COMING FROM THE ENGINE BAY, FLICKERING DASHBOARD LIGHTS, OR THE BATTERY WARNING LIGHT ILLUMINATING ON THE DASHBOARD. REGULAR INSPECTIONS AND MAINTENANCE ARE CRITICAL, AS A FAULTY ALTERNATOR CAN LEAD TO UNEXPECTED VEHICLE SHUTDOWNS. ### TIE RODS: STEERING SYSTEM ESSENTIALS TIE RODS ARE INTEGRAL TO THE STEERING MECHANISM OF A VEHICLE, CONNECTING THE STEERING RACK TO THE STEERING KNUCKLES ON THE WHEELS. WHEN YOU TURN THE STEERING WHEEL, THE STEERING RACK MOVES THE TIE RODS, WHICH IN TURN ROTATE THE WHEELS. THIS MECHANICAL LINKAGE ALLOWS THE DRIVER TO CONTROL THE DIRECTION OF THE VEHICLE ACCURATELY. TIE RODS CONSIST OF AN INNER AND OUTER END. THE INNER TIE ROD IS CONNECTED TO THE STEERING RACK, WHILE THE OUTER TIE ROD CONNECTS TO THE STEERING KNUCKLE. THESE COMPONENTS WORK TOGETHER TO ALLOW FOR ADJUSTMENTS IN ALIGNMENT AND TO COMPENSATE FOR WEAR OVER TIME. WORN TIE RODS CAN RESULT IN UNUSUAL TIRE WEAR, LOOSENESS IN THE STEERING WHEEL, OR EVEN A COMPLETE LOSS OF STEERING CONTROL IN SEVERE CASES. THE IMPORTANCE OF MAINTAINING TIE RODS CANNOT BE OVERSTATED. OVER TIME, TIE RODS CAN WEAR OUT DUE TO EXPOSURE TO ROAD DEBRIS, SALT, AND GENERAL WEAR AND TEAR. SIGNS OF WORN TIE RODS INCLUDE STEERING WHEEL VIBRATIONS, A "CLUNKING" NOISE WHEN TURNING, AND UNEVEN TIRE WEAR. REGULAR INSPECTIONS ARE VITAL, AND ANY SIGNS OF DAMAGE SHOULD BE ADDRESSED IMMEDIATELY TO MAINTAIN SAFE STEERING OPERATION. ### BRAKE FLUID: THE LIFEBLOOD OF YOUR VEHICLE'S BRAKING SYSTEM BRAKE FLUID PLAYS A CRUCIAL ROLE IN A VEHICLE'S BRAKING SYSTEM BY TRANSFERRING FORCE FROM THE BRAKE PEDAL TO THE BRAKES THEMSELVES. MOST MODERN VEHICLES USE A HYDRAULIC BRAKE SYSTEM, WHERE BRAKE FLUID IS COMPRESSED WITHIN THE LINES, CAUSING THE BRAKE PADS TO PRESS AGAINST THE ROTORS AND SLOW THE VEHICLE. BRAKE FLUID IS SPECIALLY FORMULATED TO WORK UNDER EXTREME CONDITIONS. IT MUST MAINTAIN A STABLE VISCOSITY AT HIGH TEMPERATURES TO ENSURE CONSISTENT BRAKING PERFORMANCE. THERE ARE SEVERAL TYPES OF BRAKE FLUID, INCLUDING DOT 3, DOT 4, AND DOT 5, EACH WITH DIFFERENT CHEMICAL COMPOSITIONS AND BOILING POINTS. USING THE WRONG TYPE OF FLUID CAN LEAD TO DECREASED BRAKING PERFORMANCE OR DAMAGE TO THE BRAKE SYSTEM. BRAKE FLUID IS ALSO HYGROSCOPIC, MEANING IT ABSORBS MOISTURE FROM THE AIR OVER TIME. THIS MOISTURE CAN LOWER THE FLUID'S BOILING POINT, WHICH CAN LEAD TO A DANGEROUS CONDITION KNOWN AS "VAPOR LOCK" WHERE THE BRAKES BECOME INEFFECTIVE DUE TO THE PRESENCE OF COMPRESSIBLE GAS VAPORS IN THE LINES. TO PREVENT THIS, BRAKE FLUID SHOULD BE FLUSHED AND REPLACED ACCORDING TO THE MANUFACTURER'S RECOMMENDED SCHEDULE. ### TRANSMISSION CONTROL MODULE (TCM): THE BRAINS BEHIND YOUR TRANSMISSION THE TRANSMISSION CONTROL MODULE (TCM) IS A CRUCIAL ELECTRONIC COMPONENT THAT MANAGES THE AUTOMATIC TRANSMISSION SYSTEM IN A VEHICLE. THE TCM RECEIVES DATA FROM A NETWORK OF SENSORS THROUGHOUT THE VEHICLE, INCLUDING VEHICLE SPEED, ENGINE LOAD, AND THROTTLE POSITION. IT USES THIS DATA TO CONTROL WHEN AND HOW THE TRANSMISSION SHIFTS GEARS, ENSURING SMOOTH AND EFFICIENT OPERATION. THE TCM WORKS IN CONJUNCTION WITH THE ENGINE CONTROL MODULE (ECM) AND OTHER SYSTEMS TO PROVIDE OPTIMAL PERFORMANCE AND FUEL EFFICIENCY. FOR EXAMPLE, UNDER HEAVY ACCELERATION, THE TCM MAY DELAY A GEAR SHIFT TO PROVIDE MORE POWER, WHILE DURING LIGHT CRUISING, IT MAY SHIFT EARLIER TO CONSERVE FUEL. IN ADDITION, THE TCM CONTROLS FEATURES SUCH AS TORQUE CONVERTER LOCKUP, WHICH IMPROVES FUEL ECONOMY AT HIGHWAY SPEEDS. SYMPTOMS OF A FAILING TCM INCLUDE HARSH OR ERRATIC GEAR SHIFTS, DELAYED ENGAGEMENT WHEN SHIFTING INTO DRIVE OR REVERSE, AND A "CHECK ENGINE" LIGHT OR TRANSMISSION WARNING LIGHT ON THE DASHBOARD. A MALFUNCTIONING TCM CAN LEAD TO SIGNIFICANT TRANSMISSION DAMAGE IF NOT ADDRESSED PROMPTLY. IF ANY OF THESE SYMPTOMS ARE PRESENT, IT IS IMPORTANT TO HAVE THE TCM DIAGNOSED AND REPAIRED BY A QUALIFIED TECHNICIAN.### CAMSHAFTS: TIMING IS EVERYTHING THE CAMSHAFT IS A VITAL COMPONENT IN AN INTERNAL COMBUSTION ENGINE, RESPONSIBLE FOR CONTROLLING THE OPENING AND CLOSING OF THE ENGINE'S INTAKE AND EXHAUST VALVES. THE TIMING OF THESE VALVES IS CRITICAL TO THE ENGINE'S PERFORMANCE AND EFFICIENCY. THE CAMSHAFT IS DRIVEN BY THE CRANKSHAFT VIA A TIMING BELT OR CHAIN AND SYNCHRONIZED TO ENSURE THE VALVES OPEN AND CLOSE AT PRECISE INTERVALS DURING THE ENGINE'S CYCLE. EACH LOBE ON THE CAMSHAFT IS SHAPED TO PUSH A VALVE OPEN AT THE RIGHT TIME AND ALLOW IT TO CLOSE WHEN NECESSARY. HIGH-PERFORMANCE ENGINES MAY USE MULTIPLE CAMSHAFTS (KNOWN AS DUAL OVERHEAD CAMS OR DOHC) TO IMPROVE AIRFLOW AND INCREASE POWER OUTPUT. CAMSHAFTS CAN BE CUSTOMIZED OR TUNED TO ALTER THE ENGINE'S CHARACTERISTICS, WITH AGGRESSIVE CAM PROFILES ALLOWING FOR HIGHER RPM AND MORE POWER AT THE EXPENSE OF LOW-END TORQUE AND SMOOTH IDLING. A WORN OR DAMAGED CAMSHAFT CAN CAUSE A VARIETY OF ENGINE PROBLEMS, INCLUDING ROUGH IDLING, MISFIRING, AND LOSS OF POWER. CAMSHAFT WEAR CAN ALSO LEAD TO INCREASED EMISSIONS, AS IMPROPERLY TIMED VALVES CAN RESULT IN INCOMPLETE COMBUSTION. REGULAR INSPECTION AND MAINTENANCE OF THE CAMSHAFT AND RELATED COMPONENTS, SUCH AS THE TIMING BELT OR CHAIN, ARE ESSENTIAL TO ENSURE THE ENGINE OPERATES SMOOTHLY ### OXYGEN SENSORS: MONITORING EMISSIONS FOR OPTIMAL PERFORMANCE OXYGEN SENSORS ARE ESSENTIAL FOR MAINTAINING THE PROPER AIR-FUEL RATIO IN A VEHICLE'S ENGINE. THESE SENSORS MONITOR THE LEVEL OF OXYGEN IN THE EXHAUST GASES AND PROVIDE FEEDBACK TO THE ENGINE CONTROL UNIT (ECU). BASED ON THIS FEEDBACK, THE ECU ADJUSTS THE FUEL INJECTION SYSTEM TO ENSURE OPTIMAL COMBUSTION AND MINIMIZE EMISSIONS. MODERN VEHICLES TYPICALLY HAVE MULTIPLE OXYGEN SENSORS, INCLUDING UPSTREAM SENSORS LOCATED BEFORE THE CATALYTIC CONVERTER AND DOWNSTREAM SENSORS LOCATED AFTER THE CATALYTIC CONVERTER. UPSTREAM SENSORS MONITOR THE OXYGEN LEVELS IN THE EXHAUST GASES BEFORE THEY REACH THE CATALYTIC CONVERTER, ALLOWING THE ECU TO ADJUST THE FUEL MIXTURE FOR OPTIMAL PERFORMANCE. DOWNSTREAM SENSORS, ON THE OTHER HAND, MEASURE THE EFFICIENCY OF THE CATALYTIC CONVERTER IN REDUCING EMISSIONS. A FAULTY OXYGEN SENSOR CAN LEAD TO A VARIETY OF ISSUES, INCLUDING POOR FUEL ECONOMY, INCREASED EMISSIONS, AND ENGINE PERFORMANCE PROBLEMS SUCH AS ROUGH IDLING OR HESITATION DURING ACCELERATION. COMMON SYMPTOMS OF A BAD OXYGEN SENSOR INCLUDE A CHECK ENGINE LIGHT, HIGHER THAN NORMAL FUEL CONSUMPTION, AND FAILED EMISSIONS TESTS. REPLACING A FAULTY OXYGEN SENSOR IS CRUCIAL FOR MAINTAINING THE VEHICLE'S FUEL EFFICIENCY AND REDUCING HARMFUL EMISSIONS

●○○ 3800_URL_D2_107M_TOK.TXT

AIR CONDITIONING SYSTEMS: MAINTAINING COMFORT IN ALL CONDITIONS THE AIR CONDITIONING SYSTEM IN A VEHICLE PLAYS A CRUCIAL ROLE IN ENSURING A COMFORTABLE INTERIOR ENVIRONMENT, ESPECIALLY DURING HOT WEATHER. THE SYSTEM WORKS BY REMOVING HEAT AND MOISTURE FROM THE AIR INSIDE THE VEHICLE AND DISCHARGING IT OUTSIDE. THE MAIN COMPONENTS OF THE AIR CONDITIONING SYSTEM INCLUDE THE COMPRESSOR, CONDENSER, EVAPORATOR, EXPANSION VALVE, AND REFRIGERANT. THE COMPRESSOR IS THE HEART OF THE AIR CONDITIONING SYSTEM, RESPONSIBLE FOR CIRCULATING THE REFRIGERANT THROUGH THE SYSTEM. IT COMPRESSES THE REFRIGERANT GAS, RAISING ITS TEMPERATURE AND PRESSURE BEFORE IT IS SENT TO THE CONDENSER. THE CONDENSER, TYPICALLY LOCATED IN FRONT OF THE RADIATOR, COOLS THE REFRIGERANT GAS, CONVERTING IT INTO A LIQUID STATE. THIS LIQUID REFRIGERANT THEN PASSES THROUGH THE EXPANSION VALVE, WHERE IT EXPANDS AND COOLS BEFORE ENTERING THE EVAPORATOR. INSIDE THE EVAPORATOR, THE COOL REFRIGERANT ABSORBS HEAT FROM THE AIR BLOWING THROUGH THE EVAPORATOR COILS, COOLING THE AIR BEFORE IT IS CIRCULATED INTO THE VEHICLE'S INTERIOR. THE REFRIGERANT, NOW WARMED, RETURNS TO THE COMPRESSOR TO BEGIN THE CYCLE AGAIN. MAINTAINING THE AIR CONDITIONING SYSTEM INVOLVES REGULARLY CHECKING THE REFRIGERANT LEVELS, INSPECTING THE BELTS AND HOSES, AND ENSURING THE CONDENSER AND EVAPORATOR ARE CLEAN AND FREE OF DEBRIS. ### MUFFLERS: SILENCING THE ENGINE'S ROAR THE MUFFLER IS AN INTEGRAL PART OF A VEHICLE'S EXHAUST SYSTEM, DESIGNED TO REDUCE THE NOISE PRODUCED BY THE ENGINE'S EXHAUST GASES. WITHOUT A MUFFLER, THE EXHAUST GASES WOULD EXIT THE VEHICLE WITH A LOUD, UNPLEASANT ROAR. MUFFLERS USE A SERIES OF CHAMBERS AND BAFFLES TO ABSORB AND DISSIPATE SOUND WAVES, ALLOWING EXHAUST GASES TO ESCAPE QUIETLY. IN ADDITION TO REDUCING NOISE, MUFFLERS ALSO HELP IMPROVE THE VEHICLE'S OVERALL PERFORMANCE. A WELL-DESIGNED MUFFLER MINIMIZES BACKPRESSURE, ALLOWING EXHAUST GASES TO EXIT THE ENGINE MORE EFFICIENTLY. THIS CAN LEAD TO INCREASED HORSEPOWER AND IMPROVED FUEL EFFICIENCY. HIGH-PERFORMANCE MUFFLERS ARE OFTEN TUNED TO PROVIDE A DEEPER, MORE AGGRESSIVE EXHAUST NOTE, ENHANCING THE VEHICLE'S SOUND WITHOUT BEING OVERLY LOUD. OVER TIME, MUFFLERS CAN BECOME CLOGGED OR DAMAGED, LEADING TO INCREASED EXHAUST NOISE AND POTENTIALLY REDUCING ENGINE PERFORMANCE. SIGNS OF A FAILING MUFFLER INCLUDE A LOUDER THAN NORMAL EXHAUST, A RUMBLING OR BANGING NOISE FROM THE REAR OF THE VEHICLE, AND VISIBLE RUST OR DAMAGE TO THE MUFFLER ITSELF. REGULAR INSPECTION AND REPLACEMENT OF THE MUFFLER ARE IMPORTANT FOR MAINTAINING A QUIET AND EFFICIENT EXHAUST SYSTEM. ### SERPENTINE BELTS: DRIVING YOUR VEHICLE'S ACCESSORIES THE SERPENTINE BELT IS A LONG, CONTINUOUS BELT THAT DRIVES MANY OF THE VEHICLE'S ACCESSORIES, INCLUDING THE ALTERNATOR, POWER STEERING PUMP, WATER PUMP, AND AIR CONDITIONING COMPRESSOR. NAMED FOR ITS SNAKE-LIKE PATH AROUND THESE COMPONENTS, THE SERPENTINE BELT IS CRITICAL TO THE OPERATION OF THESE ACCESSORIES. SERPENTINE BELTS ARE MADE FROM DURABLE, HEAT-RESISTANT MATERIALS DESIGNED TO WITHSTAND THE RIGORS OF THE ENGINE COMPARTMENT. HOWEVER, LIKE ALL BELTS, THEY CAN WEAR OUT OVER TIME. SIGNS OF A WORN SERPENTINE BELT INCLUDE A SQUEALING NOISE FROM THE ENGINE BAY, VISIBLE CRACKS OR FRAYING ON THE BELT, AND ACCESSORIES FAILING TO OPERATE PROPERLY. IF THE SERPENTINE BELT BREAKS, IT CAN LEAD TO A LOSS OF POWER STEERING, BATTERY CHARGING, AND ENGINE COOLING, WHICH CAN RESULT IN A BREAKDOWN. REGULAR INSPECTION AND TIMELY REPLACEMENT OF THE SERPENTINE BELT ARE ESSENTIAL TO ENSURING THAT ALL OF THE VEHICLE'S ACCESSORIES OPERATE PROPERLY. MANY MANUFACTURERS RECOMMEND REPLACING THE SERPENTINE BELT EVERY 60,000 TO 100,000 MILES, BUT IT'S IMPORTANT TO FOLLOW THE SPECIFIC RECOMMENDATIONS FOR YOUR VEHICLE. ### TACHOMETERS: MONITORING ENGINE PERFORMANCE A TACHOMETER IS AN INSTRUMENT THAT MEASURES THE ENGINE'S REVOLUTIONS PER MINUTE (RPM), PROVIDING THE DRIVER WITH CRUCIAL INFORMATION ABOUT THE ENGINE SPEED. TACHOMETERS ARE ESPECIALLY USEFUL IN MANUAL TRANSMISSION VEHICLES, WHERE THE DRIVER NEEDS TO SHIFT GEARS BASED ON THE ENGINE SPEED. BY MONITORING THE TACHOMETER, THE DRIVER CAN SHIFT GEARS AT THE OPTIMAL TIME, ENSURING SMOOTH ACCELERATION AND PREVENTING ENGINE OVER-REVVING. TACHOMETERS WORK BY RECEIVING A SIGNAL FROM THE IGNITION SYSTEM OR ENGINE CONTROL MODULE (ECM). THIS SIGNAL IS PROCESSED AND DISPLAYED AS A NUMBER OF REVS PER MINUTE ON THE TACHOMETER GAUGE, WHICH IS TYPICALLY LOCATED ON THE VEHICLE'S DASHBOARD. THE GAUGE USUALLY INCLUDES A REDLINE, INDICATING THE MAXIMUM SAFE ENGINE SPEED. EXCEEDING THE REDLINE CAN CAUSE SERIOUS ENGINE DAMAGE, SO IT'S IMPORTANT FOR DRIVERS TO PAY ATTENTION TO THE TACHOMETER, ESPECIALLY DURING HIGH-PERFORMANCE DRIVING. IN ADDITION TO MANUAL TRANSMISSION VEHICLES, TACHOMETERS CAN ALSO BE FOUND IN MANY AUTOMATIC TRANSMISSION VEHICLES, WHERE THEY PROVIDE THE DRIVER WITH INSIGHT INTO THE ENGINE'S PERFORMANCE AND HELP THEM MONITOR THE VEHICLE'S OPERATING CONDITIONS. ### CONCLUSION: MAINTAINING VEHICLE COMPONENTS FOR LONGEVITY AND SAFETY THE COMPONENTS DISCUSSED HERE ARE CRITICAL TO THE FUNCTION AND SAFETY OF A VEHICLE. EACH PLAYS A UNIQUE ROLE IN ENSURING THAT THE VEHICLE OPERATES SMOOTHLY, EFFICIENTLY, AND RELIABLY. WHETHER IT'S THE ALTERNATOR, TIE RODS, BRAKE FLUID, TRANSMISSION CONTROL MODULE, CAMSHAFT, OXYGEN SENSORS, AIR CONDITIONING SYSTEM, MUFFLER, SERPENTINE BELT, OR TACHOMETER, PROPER MAINTENANCE AND TIMELY REPLACEMENT ARE ESSENTIAL TO KEEPING THE VEHICLE IN GOOD WORKING ORDER. VEHICLE OWNERS SHOULD FOLLOW THE MANUFACTURER'S RECOMMENDED MAINTENANCE SCHEDULE AND HAVE THEIR VEHICLES INSPECTED REGULARLY BY A QUALIFIED TECHNICIAN. BY TAKING CARE OF THESE ESSENTIAL COMPONENTS, DRIVERS CAN ENSURE THAT THEIR VEHICLES REMAIN SAFE, RELIABLE, AND EFFICIENT FOR MANY YEARS TO COME.

"META": {"URL": "HTTPS://WWW.PLACEHOLDERDUMMYURL.COM/AUTOMOTIVE_BLOG_COMPLETE_EXPANDED"} }

FIG. 4D

SYSTEMS AND METHODS FOR PRODUCING DOMAIN-SPECIFIC DATA FOR AI MODEL TRAINING

BACKGROUND

Field

The present disclosure is generally directed to information handling systems, and more specifically, to systems and methods for producing domain-specific data for training generative AI models.

Related Art

Generative AI models are becoming increasingly popular in various natural language tasks such as language understanding, machine translation, summarization, question answering, textual analysis. The availability of large amounts of textual data is crucial for training these models, where the importance of the quality of the data outweighs the importance of the quantity of the collected data. Technological advancements in open-source language models have led to the development of various larger parameter models by organizations such as Meta, Falcon, and Mistral.

Existing general purpose generative AI models, while highly capable, oftentimes hallucinate and produce incorrect output responses to domain-specific questions. Additionally, they suffer from cutoff dates of the data used to train the model, which complicates knowledge ingestion from the pool of vast web crawls.

Further, unstructured textual data, despite its abundance on the web, is often noisy and requires heavy pre-processing to be suitable for training a model. More importantly, segregating the data needed for training specialized language models becomes increasingly difficult.

Furthermore, existing LLMs have inherent context limits, i.e., a finite number of tokens that can be used as input and output (e.g., 8192 for GPT-4), which is insufficient to process lengthy documents, such as service manuals, which oftentimes contain text that far exceeds the limits set for LLMs. One possible workaround is to utilize retrieval augmented generation (RAG), which integrates a retrieval mechanism to fetch only relevant contextual information from large inputs. The retrieved data is subsequently used by the LLM to produce coherent and contextually relevant responses.

Existing approaches generate criteria and predefined rules to crawl, scrape, and collect metadata related to online applications. Some approaches define a method to configure a web crawler to systematically collect information from webpages based on user-selected nodes and configurations. While such approaches present a method to systematically crawl webpages using Python and related tools, they do not focus on crawling webpages to obtain domain-specific data based on expert input, which is necessary for fine-tuning domain-specific generative AI models.

SUMMARY

In some aspects of the disclosure, a method for collecting and validating domain-specific data for training generative AI models comprises: identifying seed documents, which may be selected based on expert knowledge in a domain, e.g., from at least one of a book, a report, or a journal article relevant to the domain; extracting keywords or keyphrases from the seed documents using a generative AI model or an API of the generative AI Model to obtain extracted keywords or keyphrases; combining and deduplicating the extracted keywords to obtain refined keywords or keyphrases; performing a search process using the refined keywords or keyphrases to identify documents associated with the refined keywords or keyphrases; performing a scraping process to scrape content from the documents, e.g., by using a dedicated scraping tool that enhances a data acquisition efficiency, to obtain scraped content; chunking the scraped content into specific token sizes and storing and indexing the scraped content in a vector database; validating a relevance of the scraped content using the generative AI model to obtain validated content, e.g., by classifying text based on domain-specific criteria; performing at least one of cleaning, deduplicating, or pre-processing of the validated content to enhance a quality of the validated content, e.g., by discarding non-relevant text as determined by the generative AI model; creating a benchmark dataset including a domain-specific prompt, e.g., as a multiple-choice or true-false question, and corresponding true label; using the benchmark dataset to evaluate a performance of the generative AI model to obtain an evaluation result; based on the evaluation result, performing an iterative refinement process, which may include repeating data collection and validation steps until the predetermined accuracy threshold is met, until a predetermined accuracy threshold of benchmark performance is met; and saving a final dataset as a corpus for training a domain-specific generative AI model. The final dataset may then be used to train the domain-specific generative AI model to enhance its performance on a domain-specific task.

In some aspects, a duplicate keyword or a duplicate keyphrase may be removed to enhance an efficiency of the search process. To save storage space, the search process may be halted as soon as the predetermined accuracy threshold is reached.

In some aspects, the documents are identified by using a search engine application programming interface (API). URLs of the documents may be stored and additional scraping processed may be performed at a further depth such as to acquire additional relevant content.

In some aspects, at least one of the cleaning, deduplication, or pre-processing comprises using rules to organize and refine the validated content.

In some aspects, evaluating the performance includes converting at least one of a question or a text chunk into a vector format and performing a semantic vector similarity search. Questions that yielded incorrect answers during an evaluation are selected to identify topics for which to acquire additional information.

In some aspects, for a non-transitory computer-readable medium for storing instructions for executing a process, the instructions may comprise: identifying seed documents based on expert knowledge in a domain; extracting keywords or keyphrases from the seed documents using a generative AI model to obtain extracted keywords or keyphrases; combining and deduplicating the extracted keywords to obtain refined keywords or keyphrases; performing a search process using the refined keywords or keyphrases to identify documents associated with the refined keywords or keyphrases; performing a scraping process to scrape content from the documents to obtain scraped content; chunking the scraped content into specific token sizes and storing and indexing the scraped content in a vector database; validating a relevance of the scraped content using the generative AI model to obtain validated content; performing at least one of cleaning, deduplicating, or pre-processing of the validated content to enhance a quality of the validated content; creating a benchmark dataset including a domain-specific prompt and corresponding true label; using the benchmark dataset to evaluate a performance of the generative AI model to obtain an evaluation result; based on the evaluation result, performing an iterative refinement process until a predetermined accuracy threshold of benchmark performance is met; and saving a final dataset as a corpus for training a domain-specific generative AI model.

Aspects of the present disclosure can involve a system, which can involve means for identifying seed documents based on expert knowledge in a domain; means for extracting keywords or keyphrases from the seed documents using a generative AI model to obtain extracted keywords or keyphrases; means for combining and deduplicating the extracted keywords to obtain refined keywords or keyphrases; means for performing a search process using the refined keywords or keyphrases to identify documents associated with the refined keywords or keyphrases; means for performing a scraping process to scrape content from the documents to obtain scraped content; means for chunking the scraped content into specific token sizes and storing and indexing the scraped content in a vector database; means for validating a relevance of the scraped content using the generative AI model to obtain validated content; means for performing at least one of cleaning, deduplicating, or preprocessing of the validated content to enhance a quality of the validated content; means for creating a benchmark dataset including a domain-specific prompt and corresponding true label; means for using the benchmark dataset to evaluate a performance of the generative AI model to obtain an evaluation result; means for performing an iterative refinement process, based on the evaluation result, until a predetermined accuracy threshold of benchmark performance is met; and means for saving a final dataset as a corpus for training a domain-specific generative AI model.

BRIEF DESCRIPTION OF DRAWINGS

FIG. 3 illustrates an exemplary question and answer set, a true label, and a corresponding RAG output, according to various embodiments of the present disclosure.

FIG. 4A-FIG. 4D illustrate an exemplary domain-specific corpus according to various embodiments of the present disclosure.

DETAILED DESCRIPTION

Figure 1:
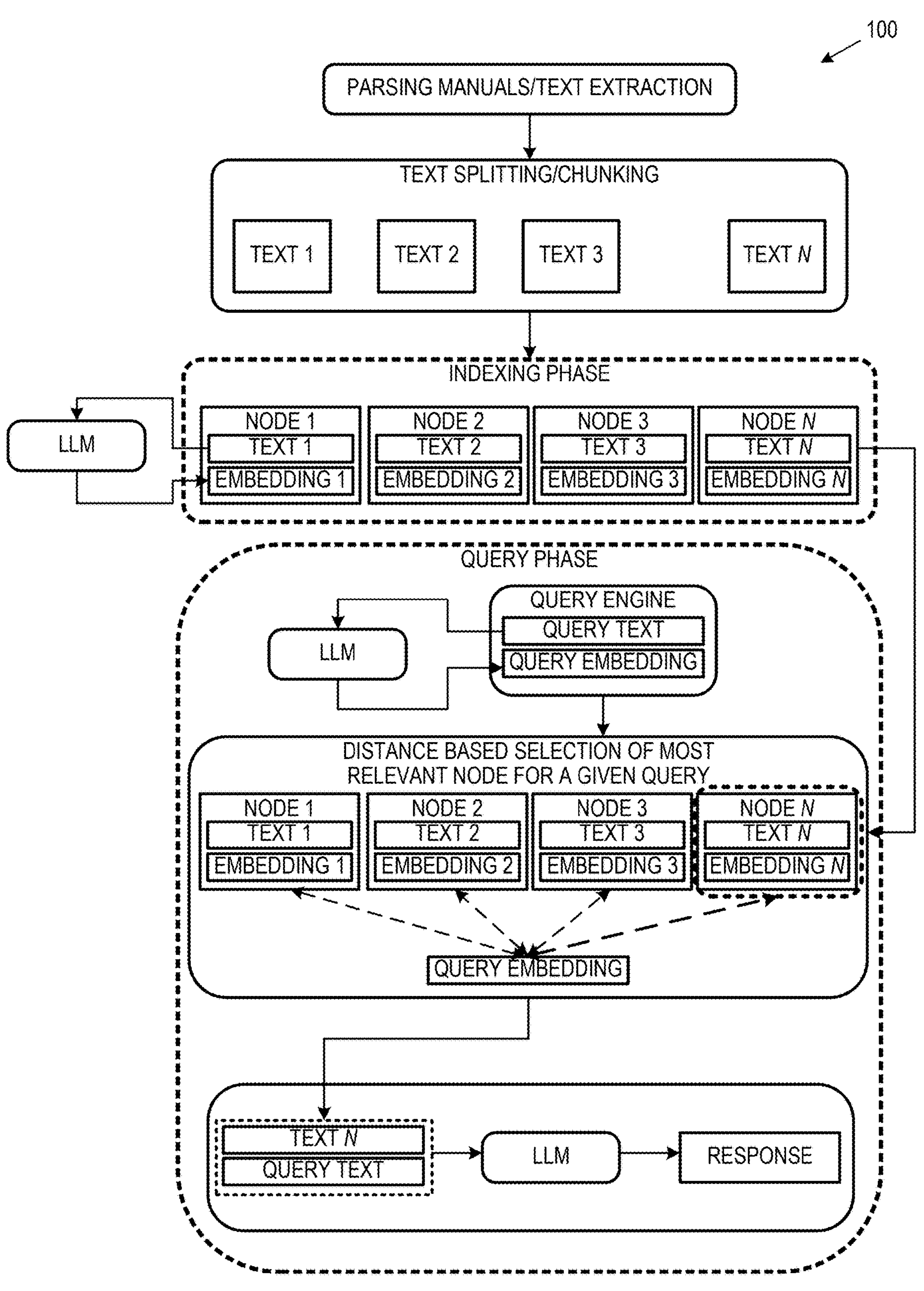
FIG. 1 illustrates a pipeline for a typical retrieval augmented generation (RAG) process.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Data acquisition for any domain is challenging, and the quality of data is becoming crucial for rapid AI applications in organizations. Aggregating domain-specific data often requires sharing internal documents in the form of logs, reports, and presentations. FIG. 1 illustrates a pipeline for a typical RAG process.

As depicted in FIG. 1, RAG process 100 comprises the following steps: parsing text, text splitting or text chunking, indexing, query embedding, similarity matching, retrieval, and augmented generation. Text chunking involves splitting unstructured input text into chunks of a specific token size (e.g., 2048 tokens per chunk). Indexing involves passing each chunk through an embedding generative AI model that yields a representative vector of values (an embedding). Each embedding and the associated text chunk are stored in a vector database. Query embedding converts the text query (prompt or question) into an embedding of values for similarity matching, which involves performing a semantic vector similarity (e.g., cosine distance) search between the query embedding and the text embeddings stored in the database. Retrieval involves selecting and retrieving the top K most similar text chunks as "context" to formulate a response to the query. Augmented generation involves passing the query and the retrieved context to a generative AI model that generates the response.

Current methods lack a systematic methodology for acquiring domain-specific data. As previously mentioned, existing approaches do not focus on crawling webpages to obtain domain-specific data, e.g., based on domain experts' input, such that the data could subsequently be used to fine-tune a domain-specific generative AI model. Even if there is some potential data available internally, expanding on top of the existing data is a very tedious task. Therefore, what is needed are systems and methods for acquiring a domain-specific textual data.

Further, since data quality, data relevancy, and data size are three important aspects of good data, upon collecting the desired data, it is desirable to incorporate techniques to validate the quality of the collected data to meet cattail requirements. This aids in understanding when to stop collecting data. Irrelevant data can easily lead to intensive computational requirements for further processing of the data whether in the form of preprocessing/cleaning or when used for generative AI model training. Therefore, collected data should be validated to meet specific requirements to ensure efficient use of computational resources during preprocessing and model training.

Figure 2:
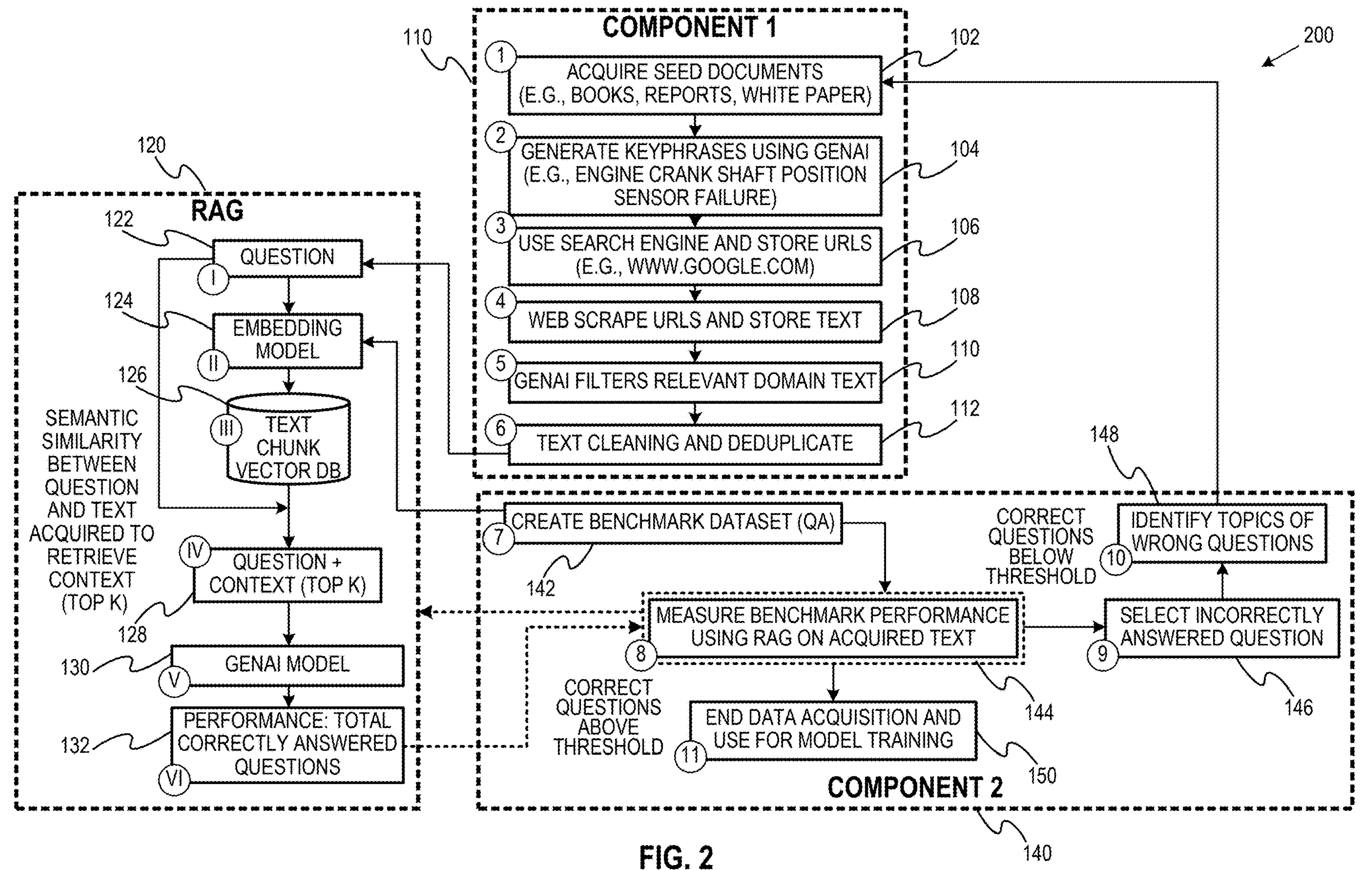
FIG. 2 illustrates an exemplary flow for creating a domain-specific textual data according to various embodiments of the present disclosure.

FIG. 2 illustrates an exemplary flow for creating a domain-specific textual data according to various embodiments of the present disclosure. In embodiments, flow 200 may comprise first component 110, which accesses RAG process 120, and second component 140. As discussed in greater detail below, component 110 is configured to perform some or all of the following steps:

i. Based on expert knowledge in the domain, identify some seed documents, which act as reference.

ii. Identify keywords/keyphrases from the documents.

iii. Combine keywords/keyphrases and remove duplicates.
iv. Pass the keywords/keyphrases to a search engine API.
v. Identify and store the relevant webpages/weblinks resulting from the search.
vi. Scrape webpage content, adhering to robots.txt and appropriate data use guidelines.
vii. Store the weblinks present on a scraped website and scrape for further depths to acquire additional relevant content.
viii. Employ a generative AI model to evaluate the relevance of the scraped webpages content.
ix. Perform cleaning, deduplication, and pre-processing of the textual data.

Similarly, in various embodiments, second component 140 may perform some or all of the following steps:

i. Create a set of questions/benchmark for dataset evaluation.
ii. Use a RAG process to answer a question from the evaluation dataset.
iii. For a retrieval step in the RAG process, use the scraped data as context.
iv. Based on the result of the benchmark, evaluate a performance, and if not satisfactory, iterate the process of data acquisition until satisfactory performance is achieved.

As depicted in FIG. 2, in embodiments, in order to perform the data collection, at step 102, a domain-specific area, e.g., "Automotive" or "Energy," may be identified first. This domain-specific area may be used to efficiently identify reference seed documents based on expert knowledge in the domain. For example, domain-expertise may be used to identify data sources that play an important role in laying the foundation for the next steps towards training a generative AI model. In-depth understanding of the domain ensures that all contextual nuances and complexities are covered. This understanding also ensures that the data is not only rich in quality and relevance but also covers the breadth and depth of the domain. Seed documents that may be gathered from a domain-specific area may include books, reports, and journal articles.

At step 104, keywords or keyphrases are extracted from the obtained documents by utilizing a generative AI model. For example, candidate keyphrases may be extracted from technicians' training books or Automotive Service Excellence (ASE) study guides using an API of GPT3.5. Exemplary keyphrases may comprise "perform cylinder power balance tests," "determine needed action, "replace valve stem seals cylinder head," and "valve train diagnosis and repair."

At step 106, a search engine may [use the keyphrases to] find URLs that may be stored in a database. Once a set of key terms is available, they may be combined, e.g., to remove repetitive phrases such as to ensure that each phrase comprises a uniqueness. This step streamlines efforts in that it significantly reduces unnecessary computational workload, thus saving valuable time for the more complex subsequent tasks.

In embodiments, the refined list of unique keyphrases may be used to perform a more sophisticated search for relevant online domains. This process mimics a general search for relevant information through relevant keyphrases. Leveraging the capabilities of, e.g., Google Custom Search API, a targeted retrieval process may be initiated. Such APIs allow developers to create a search engine by using, here, the Google core search technology. This is a powerful tool that enables querying the internet with heightened precision and returns URLs that hold content that is directly related to the specialized search terms. During this retrieval phase, the search may be continually refined, e.g., by removing duplicate URLs, enhancing the relevance and quality of the results. Advantageously, an iterative duplicate removal process optimizes the search results while reducing the computational burden.

At step 108, in response to obtaining a list of targeted URLs, text content may be automatically extracted from webpages associated with those URLs in a process, known as web scraping, by using any number of tools and techniques known in the art. A scraping task may comprise, for example, employing Scrapy, an advanced open-source tool that efficiently acquires web content. Scrapy allows users to specify a "depth" for our scraping activity, enabling data collection not only from a main page but also from linked pages, such as those accessible from the website's top navigation or sidebars. It is understood that web scraping should be done in a responsible manner, respecting each site's robots.txt rules, adhering to the proper data usage policies to ensure ethical data collection practices.

In embodiments, a scraping strategy comprise a two-level deep exploration of each website to capture the breadth of data collection with relevance. By venturing two layers into the site structure, the likelihood of discovering additional relevant content, which might not be immediately visible from the homepage or identified through an internet search, is significantly increased.

Diving deeper into the website may unnecessarily lead to an excess of irrelevant content and a reduction in the overall quality of the dataset, triggering unwanted additional filtering or other processing steps. Advantageously, the two-level scraping depth ensures that the relevancy of the gathered content is maximized and that subsequent data processing stages can be performed more efficiently.

At step 110, to ensure the gathered text is clean, relevant, and non-redundant, an LLM may be used towards a classification task of reviewing the scraped text. The LLM evaluates the text to ensure that its content is related to, here, automotive applications. Otherwise, any text that is deemed unrelated is discarded. From the pool of data that has been classified as relevant, some data may be sampled to verify the model's performance in accurately identifying relevant content and removing the non-relevant text.

Once the content is filtered in this manner, the results may be further processed by a number of systematic steps that refine the text using specific rules to organize the results to improve the quality of the data. This process directly impacts the quality of the steps performed subsequently.

At step 112, cleaning, deduplication, and pre-processing of the textual data may be performed. In embodiments, component 110 may provide this textual data as input to a RAG process 120 that is used by component 140 to create a benchmark dataset, at step 142. The benchmark dataset may contain domain-specific questions along with their true labels. The dataset may pertain to any particular task that a Generative AI model is intended to solve, such as answering multiple-choice questions or True-False questions, and the like.

At step 144, the created benchmark dataset serves as an evaluation dataset whose performance is measured by RAG process 120.

In embodiments, the evaluation dataset may be created by providing question 122 output by step 112 to RAG process 120 that converts the cleaned, deduplication, and pre-processes text into text chunks of a specific token size (e.g., 2048 tokens), which is then provided to embedding model 124 (e.g., embedding LLM) that converts the text chunks into vectors, which are stored in vector database 126. Similarly, questions 122 from the created benchmark are converted into vector format.

In embodiments, a semantic vector similarity (e.g., cosine distance) search is performed between question embedding and text chunks embedding, and the Top K highest similarity chunks are selected as "context" 128 for answering a question from benchmark dataset 142. The question and context 128 are passed to generative AI model 130 to obtain a corresponding answer.

In embodiments, once all questions 122 are answered, the performance of generative AI model 130 may be evaluated to obtain a measure for its accuracy, which may be calculated based on true labels. If the obtained accuracy is below a predefined threshold, questions that yielded incorrect answers may be selected, at step 146. Those questions may then be used to identify, at step 148, topics that would benefit from an increased knowledge-base. Specific topics may be used to identify additional documents and iterate steps in flow 200 to acquire additional information by reverting to step 102. Conversely, if the obtained accuracy is below a predefined threshold, the process may be stooped, at step 150, and the current dataset may be saved as the final corpus, e.g., for use in model training.

FIG. 3 illustrates an exemplary question and answer set, a true label, and a corresponding RAG output, according to various embodiments of the present disclosure. As depicted, the question "On a 45 degree angle valve, what interference angle is used?" has four possible answers: (a) 5 degrees, (b) 1 degree, (c) 0.5 degrees, and (d) 0.75 degrees, with the true label (b): "The valve is often ground with a face angle 1 degree less than the seat angle to compensate for the change in hot seating and to clean off the carbon" and RAG output (b) as the correct answer. Table 300 in FIG. 3 shows exemplary questions according to various embodiments of the present disclosure.

FIG. 4A-FIG. 4D illustrate an exemplary domain-specific corpus according to various embodiments of the present disclosure. The final corpus may be a collection of text that comprises a large amount of text that provides domain-specific information in unstructured form, e.g., in the automotive domain that may then be used, e.g., to train a domain-specific AI model. The previously mentioned RAG process may aid in quantifying the quality of the text of the final corpus. In embodiments, the data acquisition pipeline may halt as soon as a particular threshold of validation performance in data collection is reached. In this way, the data acquisition process and, thus, the use of available storage is optimized.

Figure 5:
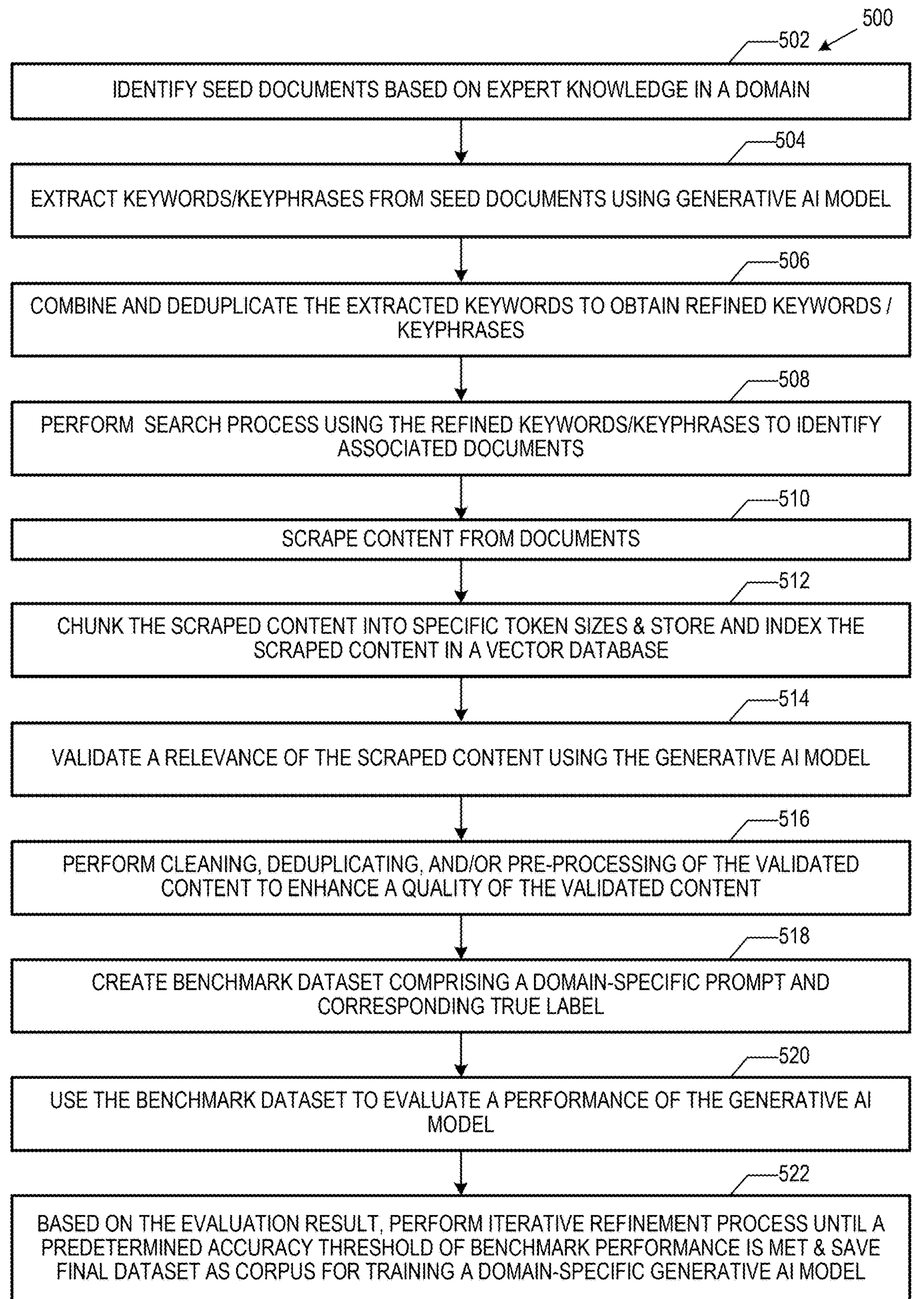
FIG. 5 is a flowchart illustrating an exemplary process for producing domain-specific data for training generative AI models in accordance with various embodiments of the present disclosure.

FIG. 5 is a flowchart illustrating an exemplary process for producing domain-specific data for training generative AI models in accordance with various embodiments of the present disclosure. In embodiment, process 500 may start at step 502, when, based on expert knowledge in a domain, seed documents are identified.

At step 504, keywords or keyphrases are extracted from the seed documents, e.g., by using a generative AI model, such as to obtain extracted keywords or keyphrases.

At step 506, the extracted keywords are combined and/or deduplicated to obtain refined keywords or keyphrases.

At step 508, a search process is performed by using the refined keywords or keyphrases to identify documents associated therewith.

At step 510, a scraping process is performed that scrapes content from the documents such as to obtain scraped content.

At step 512, the scraped content is chunked into specific token sizes. The scraped content may be stored and indexed, e.g., in a vector database.

At step 514, the relevance of the scraped content is validated, e.g., by using the generative AI model.

At step 516, cleaning, deduplicating, or pre-processing of the validated content enhances the quality of the validated content.

At step 518, a benchmark dataset comprising a domain-specific prompt and corresponding true label is created;

At step 520, the benchmark dataset is used to evaluate a performance of the generative AI model to obtain an evaluation result.

At step 522, based on the evaluation result, an iterative refinement process is performed until a predetermined accuracy threshold of benchmark performance is met. The final dataset may be saved as a corpus, e.g., for training a domain-specific generative AI model.

One skilled in the art shall recognize that: (1) certain steps may optionally be performed; (2) steps may not be limited to the specific order set forth herein; (3) certain steps may be performed in different orders; and (4) certain steps may be done concurrently.

It is noted that although the invention is generally described in the context of producing domain-specific data for training generative AI models, it is understood that this is not intended to limit the scope of the present disclosure to such embodiments as the systems and methods for collecting and validating domain-specific data described herein may be used in any other context.

Figure 6:
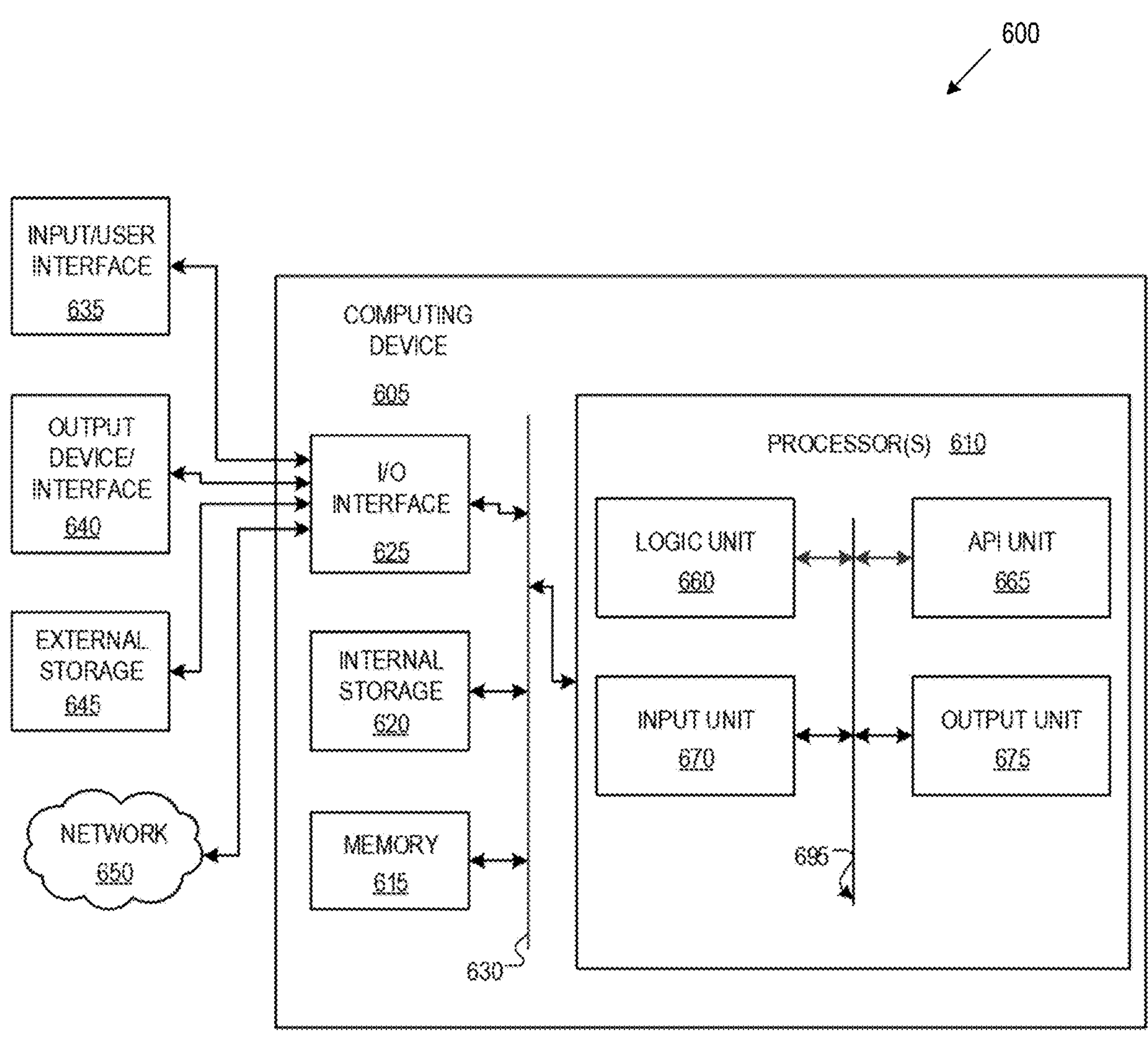
FIG. 6 illustrates an example computing environment with an example computer device according to various embodiments of the present disclosure.

FIG. 6 illustrates an example computing environment with an example computer device suitable for use in some example implementations. Computer device 605 in computing environment 600 can include one or more processing units, cores, or processors 610, memory 615 (e.g., RAM, ROM, and/or the like), internal storage 620 (e.g., magnetic, optical, solid-state storage, and/or organic), and/or I/O interface 625, any of which can be coupled on a communication mechanism or bus 630 for communicating information or embedded in the computer device 605. I/O interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via I/O interface 625) to external storage 645 and network 650 for communicating with any number of networked components, devices, and systems, including one or more computer devices of the same or different configurations. Computer device 605 or any connected computer device can be functioning as, providing services of, or referred to as a server, client, thin server, general machine, special-purpose machine, or another label.

I/O interface 625 can include wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, a satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 610 can execute under any operating system (OS) (not shown), in a native or virtual environment. One or more applications can be deployed that include logic unit 660, API unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided. Processor(s) 610 can be in the form of hardware processors such as central processing units (CPUs) or a combination of hardware and software units.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, and output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide output based on the calculations described in example implementations.

Processor(s) 610 can be configured to execute a method or computer instructions which can involve, identifying seed documents based on expert knowledge in a domain; extracting keywords or keyphrases from the seed documents using a generative AI model to obtain extracted keywords or keyphrases; and combining and deduplicating the extracted keywords to obtain refined keywords or keyphrases, as described, for example, with respect to FIG. 2 and FIG. 4A-FIG. 4D.

Processor(s) 610 can be configured to execute a method or computer instructions which can involve, performing a search process using the refined keywords or keyphrases to identify documents associated with the refined keywords or keyphrases; performing a scraping process to scrape content from the documents to obtain scraped content; chunking the scraped content into specific token sizes and storing and indexing the scraped content in a vector database; validating a relevance of the scraped content using the generative AI model to obtain validated content; performing at least one of cleaning, deduplicating, or pre-processing of the validated content to enhance a quality of the validated content, as described, for example, with respect to FIG. 2 and FIG. 4A-FIG. 4D.

Processor(s) 610 can be configured to execute a method or computer instructions which can involve, creating a benchmark dataset including a domain-specific prompt and corresponding true label; using the benchmark dataset to evaluate a performance of the generative AI model to obtain an evaluation result, as described, for example, with respect to FIG. 3.

Processor(s) 610 can be configured to execute a method or computer instructions which can involve, performing an iterative refinement process, based on the evaluation result, until a predetermined accuracy threshold of benchmark performance is met; and saving a final dataset as a corpus for training a domain-specific generative AI model, as described, for example, with respect to FIG. 4A-FIG. 4D.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities to achieve a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer-readable medium, such as a computer-readable storage medium or a computer-readable signal medium. A computer-readable storage medium may involve tangible mediums such as optical disks, magnetic disks, read-only memories, random access memories, solid-state devices, drives, or any other types of tangible or non-transitory media suitable for storing electronic information. A computer-readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for collecting and validating domain-specific data for training generative AI models, the method comprising:

identifying seed documents based on expert knowledge in a domain;

extracting keywords or keyphrases from the seed documents using a generative AI model to obtain extracted keywords or keyphrases;

combining and deduplicating the extracted keywords to obtain refined keywords or keyphrases, wherein the combining and deduplicating reduces computational workload by removing repetitive phrases;

performing a search process using the refined keywords or keyphrases to identify documents associated with the refined keywords or keyphrases;

performing a scraping process to scrape content from the documents to obtain scraped content, wherein the scraping process comprises a two-level deep exploration of each website to maximize relevancy of gathered content while reducing computational burden through iterative duplicate removal;

chunking the scraped content into specific token sizes and storing and indexing the scraped content in a vector database;

validating a relevance of the scraped content using the generative AI model to obtain validated content;

performing at least one of cleaning, deduplicating, or pre-processing of the validated content to enhance a quality of the validated content;

creating a benchmark dataset comprising a domain-specific prompt and corresponding true label;

using the benchmark dataset to evaluate a performance of the generative AI model to obtain an evaluation result;

based on the evaluation result, performing an iterative refinement process until a predetermined accuracy threshold of benchmark performance is met, wherein the benchmark dataset is created by selecting domain-specific prompts that test knowledge gaps identified through clustering of text chunks using a generative AI model, and wherein the iterative refinement process includes re-scraping content at different depth levels based on topics corresponding to incorrectly answered questions; and saving a final dataset as a corpus for training a domain-specific generative AI model.

2. The method of claim 1, further comprising removing at least one of a duplicate keyword or a duplicate keyphrase to enhance an efficiency of the search process.

3. The method of claim 1, wherein the documents are identified by using a search engine application programming interface (API).

4. The method of claim 1, wherein scraping the content from the documents comprises employing a dedicated scraping tool that enhances a data acquisition efficiency.

5. The method of claim 1, further comprising storing URLs of the documents and performing an additional scraping process at a further depth to acquire additional relevant content.

6. The method of claim 1, wherein the generative AI model obtains the validated content by classifying text based on domain-specific criteria.

7. The method of claim 1, wherein at least one of the cleaning, deduplicating, or pre-processing comprises discarding non-relevant text as determined by the generative AI model.

8. The method of claim 1, wherein at least one of the cleaning, deduplication, or pre-processing comprises using rules to organize and refine the validated content.

9. The method of claim 1, wherein the domain-specific prompt comprises at least one of a multiple-choice question or a true-false question.

10. The method of claim 1, wherein evaluating the performance comprises converting at least one of a question or a text chunk into a vector format and performing a semantic vector similarity search.

11. The method of claim 1, further comprising selecting questions that yielded incorrect answers during an evaluation to identify topics for which to acquire additional information.

12. The method of claim 1, wherein the iterative refinement process comprises repeating data collection and validation steps until the predetermined accuracy threshold is met.

13. The method of claim 1, wherein the final dataset is used to train the domain-specific generative AI model to enhance its performance on a domain-specific task.

14. The method of claim 1, wherein the search process is halted as soon as the predetermined accuracy threshold is reached to save storage space.

15. The method of claim 1, wherein the seed documents are selected from at least one of a book, a report, or a journal article relevant to the domain.

16. The method of claim 1, wherein the keywords are extracted using an API of the generative AI Model.

17. A non-transitory computer-readable medium for storing instructions for executing a process, the instructions comprising:

identifying seed documents based on expert knowledge in a domain;

extracting keywords or keyphrases from the seed documents using a generative AI model to obtain extracted keywords or keyphrases;

combining and deduplicating the extracted keywords to obtain refined keywords or keyphrases, wherein the combining and deduplicating reduces computational workload by removing repetitive phrases;

performing a search process using the refined keywords or keyphrases to identify documents associated with the refined keywords or keyphrases;

performing a scraping process to scrape content from the documents to obtain scraped content, wherein the scraping process comprises a two-level deep exploration of each website to maximize relevancy of gathered content while reducing computational burden through iterative duplicate removal;

chunking the scraped content into specific token sizes and storing and indexing the scraped content in a vector database;

validating a relevance of the scraped content using the generative AI model to obtain validated content;

performing at least one of cleaning, deduplicating, or pre-processing of the validated content to enhance a quality of the validated content;

creating a benchmark dataset comprising a domain-specific prompt and corresponding true label;

using the benchmark dataset to evaluate a performance of the generative AI model to obtain an evaluation result;

based on the evaluation result, performing an iterative refinement process until a predetermined accuracy threshold of benchmark performance is met, wherein the benchmark dataset is created by selecting domain-specific prompts that test knowledge gaps identified through clustering of text chunks using a generative AI model, and wherein the iterative refinement process includes re-scraping content at different depth levels based on topics corresponding to incorrectly answered questions; and saving a final dataset as a corpus for training a domain-specific generative AI model.

18. The non-transitory computer-readable medium of claim 17, further comprising storing URLs of the documents and performing an additional scraping process at a further depth to acquire additional relevant content.

19. The non-transitory computer-readable medium of claim 17, wherein at least one of the cleaning, deduplication, or pre-processing comprises using rules to organize and refine the validated content.

20. The non-transitory computer-readable medium of claim 17, further comprising selecting questions that yielded incorrect answers during an evaluation to identify topics for which to acquire additional information.

* * * * *